United States Patent
Shaffer

[11] Patent Number: 5,809,837
[45] Date of Patent: Sep. 22, 1998

[54] ROLLER SCREW DEVICE FOR CONVERTING ROTARY TO LINEAR MOTION

[76] Inventor: James E. Shaffer, 1780 Geronimo Trail, Maitland, Fla. 32751

[21] Appl. No.: 681,948

[22] Filed: Jul. 29, 1996

Related U.S. Application Data

[63] Continuation-in-part of Ser. No. 500,531, Jul. 11, 1995, which is a continuation of Ser. No. 237,356, May 2, 1994.

[51] Int. Cl.$^6$ .............................. F16H 1/18; F16H 25/22
[52] U.S. Cl. ........................................ 74/424.8 C; 74/459
[58] Field of Search ...................... 74/424.8 C, 424.8 R, 74/459, 89.15

[56] References Cited

U.S. PATENT DOCUMENTS

| | | | |
|---|---|---|---|
| 2,683,379 | 7/1954 | Strandgren | 74/424.8 C |
| 4,048,867 | 9/1977 | Saari | 74/424.8 B |
| 4,050,319 | 9/1977 | Stanley | 74/424.8 R X |
| 4,576,057 | 3/1986 | Saari | 74/424.8 C |
| 5,022,277 | 6/1991 | Shaffer | 74/424.8 R X |

Primary Examiner—Charles A. Marmor
Assistant Examiner—Troy Grabow
Attorney, Agent, or Firm—James H. Beusse; Maguire, Voorhis & Wells

[57] ABSTRACT

A roller screw assembly includes a threaded rod, a nut having internal, non-helical grooves and a plurality of externally grooved elongated rollers seated circumferentially about the rod and captured in place by the nut. The grooves in the nut and rollers are selected to have the same spacing as the pitch of the rod threads and with a corresponding profile so as to allow intermeshing engagement between the nut, rollers and rod. The inner surface of the nut is formed such that a cross-section normal to the axis of the rod illustrates at least one lobed area which is of sufficient extent to allow a roller in that area to translate axially with respect to the rod. The number of lobes is dependent on the number of threads or parallel helices formed on the rod. Rotation of the nut with respect to the rod enables axial translation of the nut with respect to the rod by recirculation of the grooved rollers at the lobed region.

11 Claims, 7 Drawing Sheets

ROLLER SCREW DEVICE FOR CONVERTING ROTARY TO LINEAR MOTION

This application is a continuation-in-part of U.S. application Ser. No. 08/500,531 filed Jul. 11, 1995 abandoned, which is a continuation of U.S. Pat. No. 08/237,356 filed May 2, 1994 abandoned.

The present invention relates to a screw and nut mechanism for converting one type of motion to another type of motion; and more specifically, to a roller screw apparatus for converting rotary motion to linear motion.

BACKGROUND OF THE INVENTION

Presently, there are two categories of high efficiency screw and nut mechanisms: ball screws and roller screws. Ball screws use balls, roller screws use rollers. This invention addresses roller screws, in general; and an improved, high performance, low cost roller screw, in particular.

Examples of prior art roller screws are disclosed in U.S. Pat. Nos. 3,884,090; 4,048,867; 4,050,319; 4,576,057; 4,655,100 and 4,964,314; the disclosures of which are incorporated herein by reference. Roller screws are available commercially from SKF Industries and the Illinois Tool Works (Spiracon). The higher the roller screw is in performance, the higher its cost. Compared to ball screws, roller screws are an order of magnitude more costly. On the other hand, compared to ball screws, the most costly roller screws are an order of magnitude higher in performance. It is, thus, desirable that such higher performance be made available in a roller screw that costs no more than a good ball screw.

In general, it may be said that existing broadly commercialized roller screws are capable of greater thrust than ball screws for a given envelope. Most roller screws are much faster than ball screws. Some models of roller screws are much more axially precise than ball screws. Generally roller screws are capable of higher acceleration rates. When one compares existing roller screw products to their ball screw products, there is no contest in performance. Accordingly, roller screws are important to industry and commerce because they are superior to ball screws in every category of performance.

The application of rollers (as opposed to balls) to effect high efficiency in a screw system is currently accomplished in any one of three possible commercialized systems: (1) helically threaded rollers, lead angle matched to the screw shaft lead; (2) grooved non-helical rollers deployed in sync with multi-started shaft threads; and (3) recirculated grooved non-helical rollers processed by cam activated axial shifting.

This patent application introduces a new and unique system of recirculating grooved non-helical rollers (System No. 3 above). This new system may be referred to as a recirculation of grooved rollers activated, not by separate axial cam, but, by the shaft screw thread itself operating as a cam. Such motion is accommodated by harmonious lobing of the nut hole containing the non-helical grooves.

While roller screws are generally higher performing than ball screws, roller screws are substantially more costly. The goal of this patent application is to narrow the cost but not the performance differential. Roller screws are prohibitively costly because of their complexities. The nut of system 1 above typically employs two retaining rings, two containment rings, two separator rings, two sun gears, gears on each end of each roller, and finally a nut. The rollers must be rotated to a precise clocking to assure long life. This totals nine parts in addition to some very costly gearing of rollers. This approach is also very limited in axial precision due to its necessary high thread start numbers (to achieve proper thread angles therefore matching the diametrically smaller roller threads).

High thread start numbers also detract from system No. 2 "grooved rollers deployed in sync with multi-started shaft threads". Unfortunately, when the thread numbers are decreased for greater precision, so to are the number of rollers which in turn reduces thrust capability.

System No. 3 is a recirculating approach which is very thrust-proficient but has a downside of being limited to a lower number of thread starts. Furthermore, the need for axial cam shifting is not advantageous for high rotational speeds. Additionally, the numbers of rollers are somewhat limited so as to permit efficient axial shifting.

SUMMARY OF THE INVENTION

It is, therefore, an object of the present invention to provide a high performance roller screw, whose cost is near that of a ball screw. The improved roller screw is illustrated with reference to a detailed embodiment thereof, described below. Compared to other high performance roller screws, the roller screw of the invention is far less complex and much more versatile. In particular, the improved roller screw is related loosely to System No. 3 described above. The invention taught herein provides a full range of shaft thread starts, one-third of the parts of System No. 1, without roller number limitations of System No. 2 and the axial cams required by System No. 3. The subject invention's simplicity thus brings roller screw performance into the cost range of ball screws.

BRIEF DESCRIPTION OF THE DRAWINGS

For a better understanding of the present invention, reference may be had to the following detailed description taken in conjunction with the accompanying drawings in which:

FIG. 2.1 is the view taken along the line 2.1—2.1 of FIG. 2;

FIGS. 2.1A–2.1G are views taken at the corresponding cross-sections indicated at A–G in FIG. 2;

FIG. 3 is an end view of a three lobe/three thread start implementation of the present invention;

FIG. 3.1 is a cross-section of the implementation of FIG. 3 taken along the line 3.1—3.1;

FIG. 3.2 is a flattened, or unrolled view of the embodiment of the invention shown in FIG. 3;

FIG. 3.3 is a top view of the embodiment of the invention in FIG. 3.2 taken along the lines indicated at 3.3—3.3;

FIGS. 3.1a–3.1e are cross-sectional views taken through the FIG. 3.2 at the corresponding locations a–e;

FIGS. 7.1A–7.1M are views taken in FIG. 7 at corresponding lines A–M illustrating how the roller elements cycle from one thread set to another;

DETAILED DESCRIPTION OF THE PREFERRED EMBODIMENT

Figure 1:
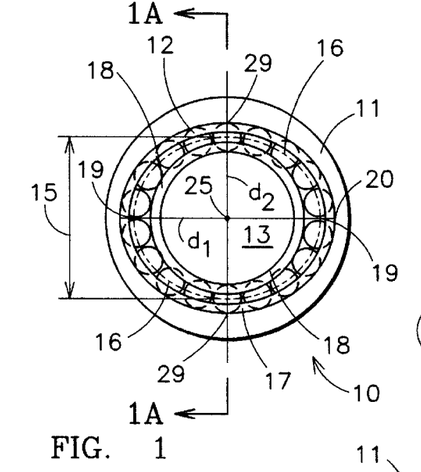
FIG. 1 and 1A illustrate a front view and a partial cross-sectional side view of the preferred embodiment of the invention depicting two phases of nut rotation of a two-lobe nut and two-thread-start shaft.
Figure 1A:
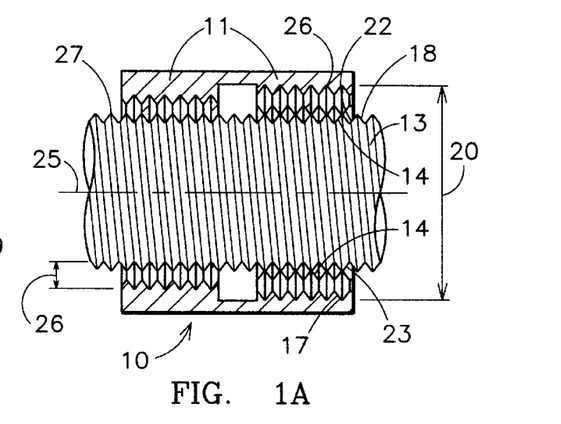

An improved roller screw 10, in accordance with the principles of the invention, is shown in end view in FIG. 1 and in a transverse cross-section in FIG. 1A. The roller screw 10 comprises a nut 11, positioned about shaft screw 13, and a plurality of rollers 12 arrayed in an ellipsoid formation indicated by line 16 connecting the centers of rollers 12 in the annular region between screw shaft 13 and nut 11. The nut 11 has internal grooves 17 while the screw shaft 13 is threaded externally involving a two-start helical thread 18. The roller elements 12 are circumferentially grooved and each groove 14 lies in a singular plane. The grooves 14 have a common pitch and profile or form with the shaft threads 18 and the nut grooves 17. Any one nut will have a groove set with at least as many grooves as do the associated rollers 12.

At equally spaced angular positions, the nut 11 will involve internal lobing 20 causing the nut groove set 17 to form a somewhat elliptical course. Since roller grooves 14 are continuous and planar, and mating ridges of the conjugate roller groove set follow the nut groove set 17, each roller 12 will trace a quasi-elliptical course as it rollingly orbits around the nut interior, always in contact with, but not always engaged fully with the helical threads in the screw shaft 13.

At the apogee 19 of the course of roller 12, the roller's periphery or major diameter 26 will clear the major diameter of the shaft thread 27. Since the shaft's thread is helical, thus having an axial component, the shaft thread crest 27 will pass under the major diameter of any and all rollers located at the apogee 19 of the roller's course during operation.

As each roller 12 reaches the elliptical apogee 19 of its orbital course, the roller's groove set 14 will pass from engagement with one shaft thread set 22 and into the adjacent thread set 23. The shaft threads 18 act as a helical cam to lift the rollers 12 to their apogee 19 and, once lifted over the major diameter 27 of the thread shaft 13, the rollers 12 are forced by the closing elliptical form of the nut grooves 17 to gradually engage, more and more, the adjacent thread set in the shaft screw 13. Engagement of the next thread set begins on the opposite thread hip from that which it recently left (before crossing the thread crest).

This ellipsoid course 16 of the rollers 12 is dictated by the shaft screw threads 18, which, because they are helical and have a lead angle, attempt to axially advance the orbiting rollers 12. Because the rollers 12 remain wholly engaged in and thus steered by the normal (to the shaft screw axis 25) nut grooves 17, the rollers 12 are forced to lift away from the helical thread 18 in a radial manner as opposed to moving axially. In this regard, this version of the invention is not as thrust capable as existing roller screws whose rollers are nearly always fully in threaded engagement. In this version only approximately half of the shaft threads 18 are loaded through the rollers 12 since only at the roller array perigee 15 is any roller 12 fully or totally engaged.

Figure 2:
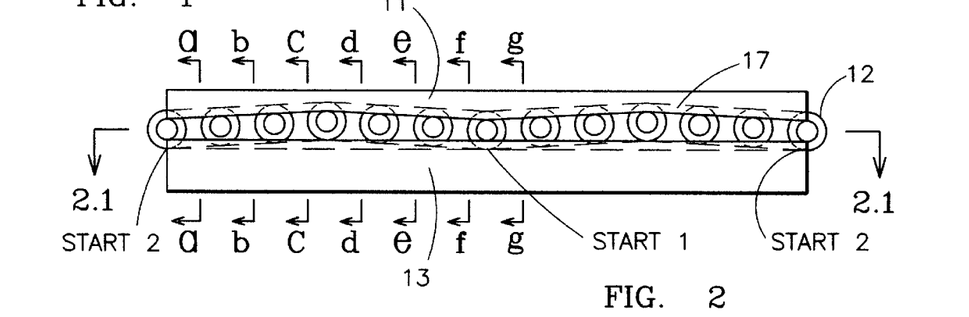
FIG. 2 illustrates a flat or unrolled end view of the roller screw assembly of FIG. 1.

FIGS. 2 through 2.1g depict a flat or unrolled development of the invention shown in FIG. 1. The grooves 17 of the nut 11 are normal to the axis 25 (FIG. 1A), while the grooves 18 of the shaft screw threads are at a lead angle other than 90 degrees thus forming a helical thread (FIG. 2.1). Thus, when either the nut 11 or screw 13 are moved laterally, (left or right in the flat view of FIG. 2) the involved rollers 12 will translate vertically i.e., in and out of the plane of the drawing figure as well as rolling laterally. This vertical roller oscillation corresponds to the rolling radial motion (between apogee and perigee) experienced in operation of the actual roller screw invention.

FIGS. 2.1a through 2.1g which correspond to views taken at a–g in FIG. 2.1, demonstrate in profile how the rollers 12 climb from the perigee 15, cross over the threads of the screw shaft at the apogee 19, then descend back into the perigee 15 in the next thread set. In a sense, the rollers 12 operate between two cams (one cam being the shaft screw threads 18 and the second, the two-lobed nut 11) The apogee 19/perigee 15 aspect of the roller array forms because of the interplay between the ellipsoid or cam form of the interior of the nut and the cam formed by the inclined plane generated by forcing the rollers 12 to operate at an angle to the shaft screw threads 18.

The cam profile of the axial hole through the grooved nut 11 shown in FIG. 1 tends toward the shape of an ellipsoid and it may be said that the major diameter indicated by line $d_1$ of the ellipsoid hole forms hollow lobes 20. Therefore, the nut form may be referred to as a double-lobed or diametrically opposed lobed nut. Essentially, FIG. 1 displays two lobes 20. The flatter sides or perigee 29 of the hole may be described as the minor diameter indicated by line $d_2$ of the ellipsoid hole. It is precisely at the minor diameter or perigee 15, that the rollers 12 see their deepest engagement in the screw shaft threads 18. As the rollers come away from the minor diameter of the shaft 13 thread, they begin to climb towards disengagement from the screw shaft threads. At the major diameter or apogee 19, the rollers achieve disengagement as shown in FIG. 2.1d.

Figure 4:
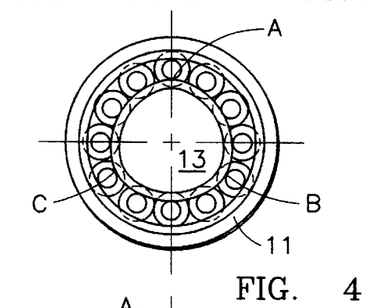
FIGS. 4 and 4A are end and side views respectively illustrating another embodiment of the invention in which the shaft is formed with lobes and the nut is helically threaded.
Figure 4A:
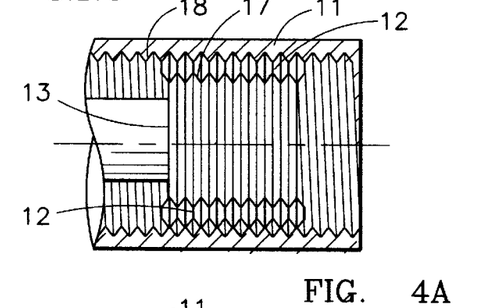
Figure 5:
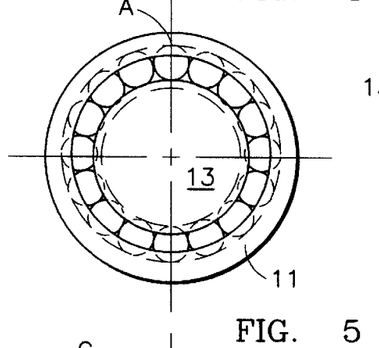
FIGS. 5 and 5A are end and side views respectively of an embodiment of the present invention in which there is a single thread start version with multiple sets of rollers with the nut having lobed sections for each set of rollers which is offset from the lobe sections in other sets of rollers.
Figure 5A:
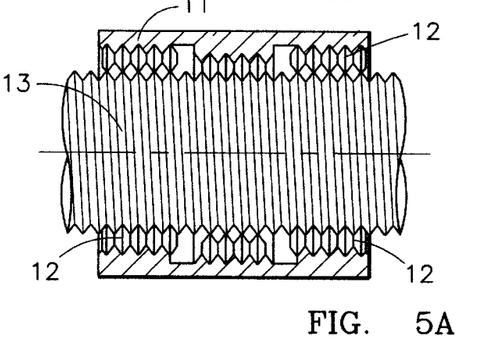
Figure 6:
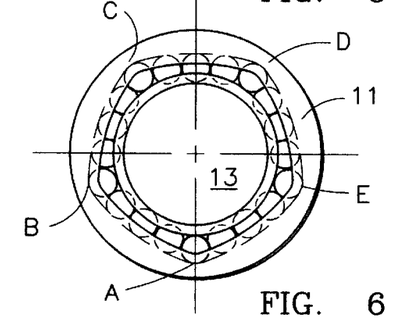
FIGS. 6 and 6A are end and side views respectively of another embodiment of the invention as applied to a five-lobed nut for use with a five thread start screw.
Figure 6A:
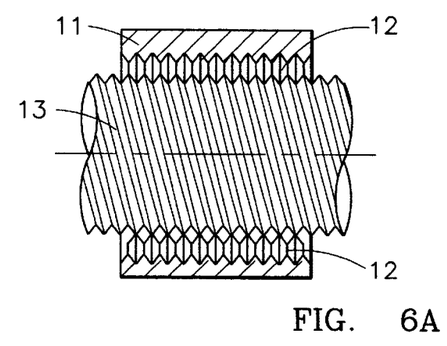
Figure 13:
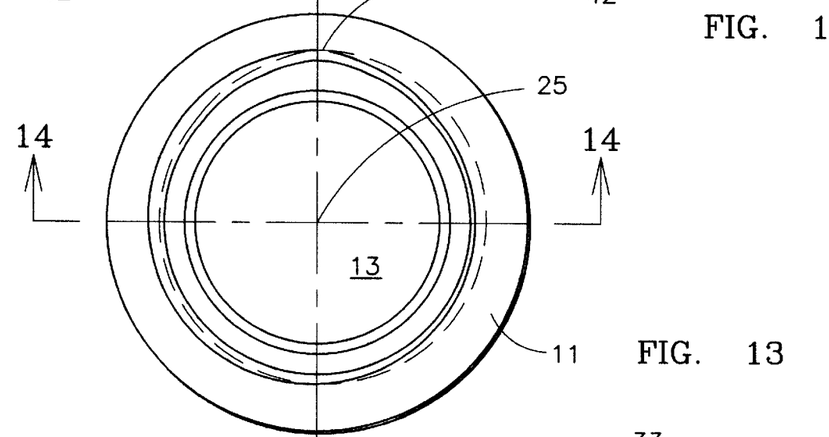
FIGS. 13 and 14 are end and cross-sectional view respectively of a single groove for use in the one-lobe system of FIG. 8 illustrating the form and cutting of a nut groove for a full engagement system.
Figure 14:
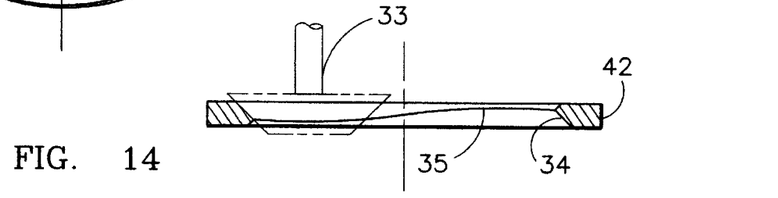

Although FIG. 1 depicts a two-lobed nut, any number of equally spaced lobes or even a single lobe as shown in FIG. 5 and more clearly in FIG. 13, may be used to effect the principle of the invention. A nut may employ three lobes A, B, C in as shown FIG. 3, four lobes or even five lobes A, B, C, D, E in as shown FIG. 6 or as many as required to match the number of thread starts where the number of thread starts is selected to obtain a desired advancement speed or an improved accuracy. Fewer thread starts give higher accuracy but less advancement speed. Furthermore, while the lobes may be formed in the nut 11 as shown in FIGS. 3, 5 and 6, an alternative is to form lobes such as shown at A, B, and C in FIG. 4 on the thread screw 13.

Figures 3, 21, 31:
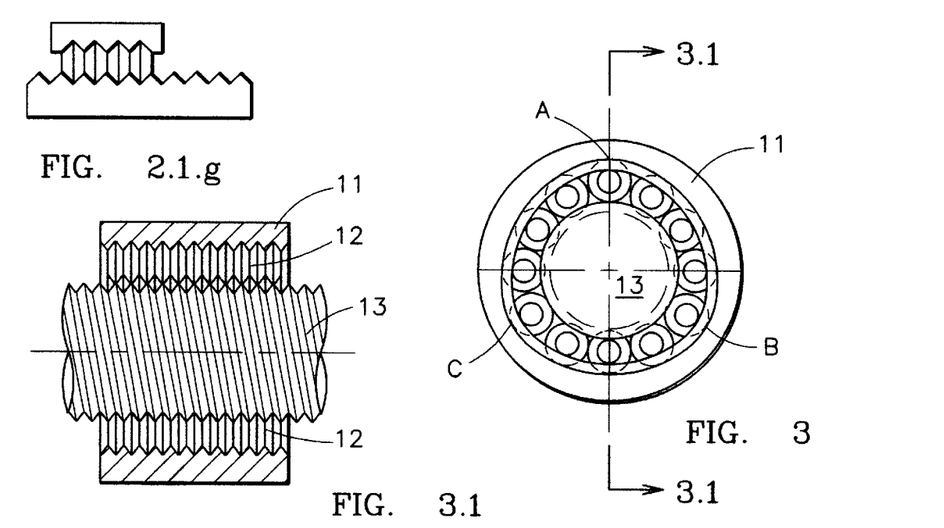

FIGS. 3 and 3A are end and partial cross-sectional views of a three-lobe nut with three-start screw.

FIG. 3.1 and 3.2 are flat or unrolled development of the three-lobe nut/three-start screw system of FIG. 3 in end view and top plan view, respectively. FIGS. 3.1a through 3.1e corresponding to views taken at lines a–e, respectively, in FIG. 3.1, show how the rollers 12 progress from complete engagement, through progressive partial engagement, and finally total disengagement. From there, the rollers 12 descend gradually into a new thread set and continue a new cycle.

Figure 7:
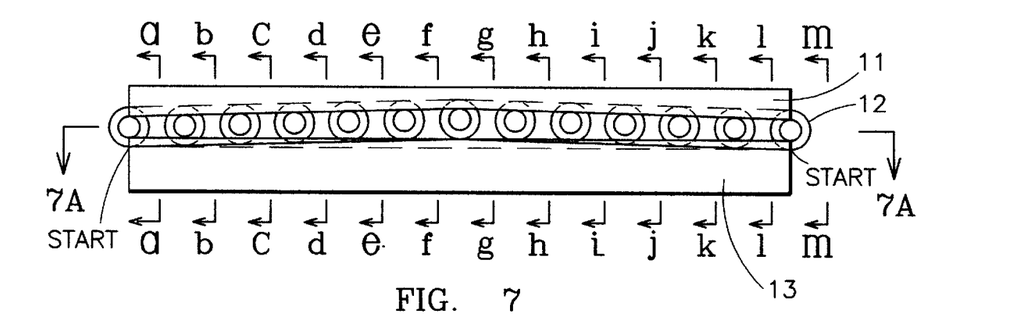
FIG. 7 is a flattened or unrolled end view of the single lobe roller screw of FIG. 5.
Figure 7A:
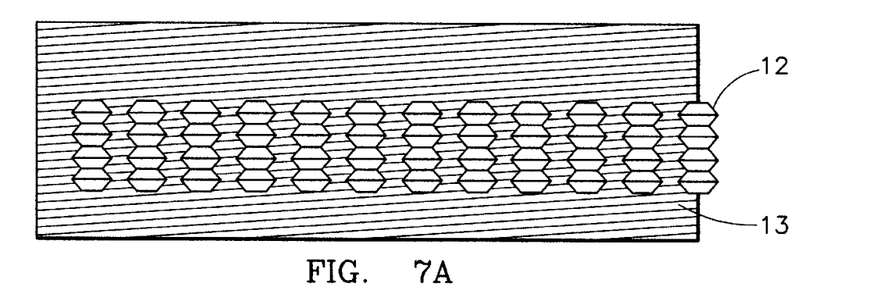
FIG. 7A is a top view of the unrolled roller system of FIG. 7 taken along the line 7A in FIG. 7.

FIGS. 7 and 7A depict a flat or unrolled development of a one-lobe/one-thread start screw system in which FIG. 7 is an end view and FIG. 7A is a top plan view showing only the rollers 12 and shaft 13. FIG. 7.1a through 7.1m, corresponding to views taken at lines a–m, respectively, in FIG. 7.1, demonstrate the roller progress from deepest engagement through the disengagement process and re-engagement.

The quantity of thread starts is in quantitative locked-step with the number of nut lobes. Thus, a one-start thread (on the threaded shaft) is employed in conjunction with a one or eccentrically lobed nut. A two-start thread teams with a two-lobed nut, as is a three-start thread with a three-lobed nut, etc. Thread, nut groove and roller groove profile has like pitch for each element, matingly matched in their every profile configuration aspect.

So long as the nut grooves 17 are in planes normal to the shaft 13 axis, much of the thrust potential of the invention will be sacrificed. FIGS. 8 through 15 depict a nut groove system that, while groove generation occurs in plane (FIG. 14), causes the rollers 12, while fully engaged, to follow the shaft thread 18 for a sustained period and then in a more brief period "b" (See FIGS. 8, 15, 16, 17) follow the prescription of the original approach (FIG. 1 through 6) to cause shaft thread 18 crossing by the rollers 12.

In this version of the invention, the rollers not only orbit and translate radially as in the prior approaches but also translate axially, back and forth, to enable full roller/shaft thread engagement (See "a") for a sustained period.

Figures 8, 9, 10, 71:
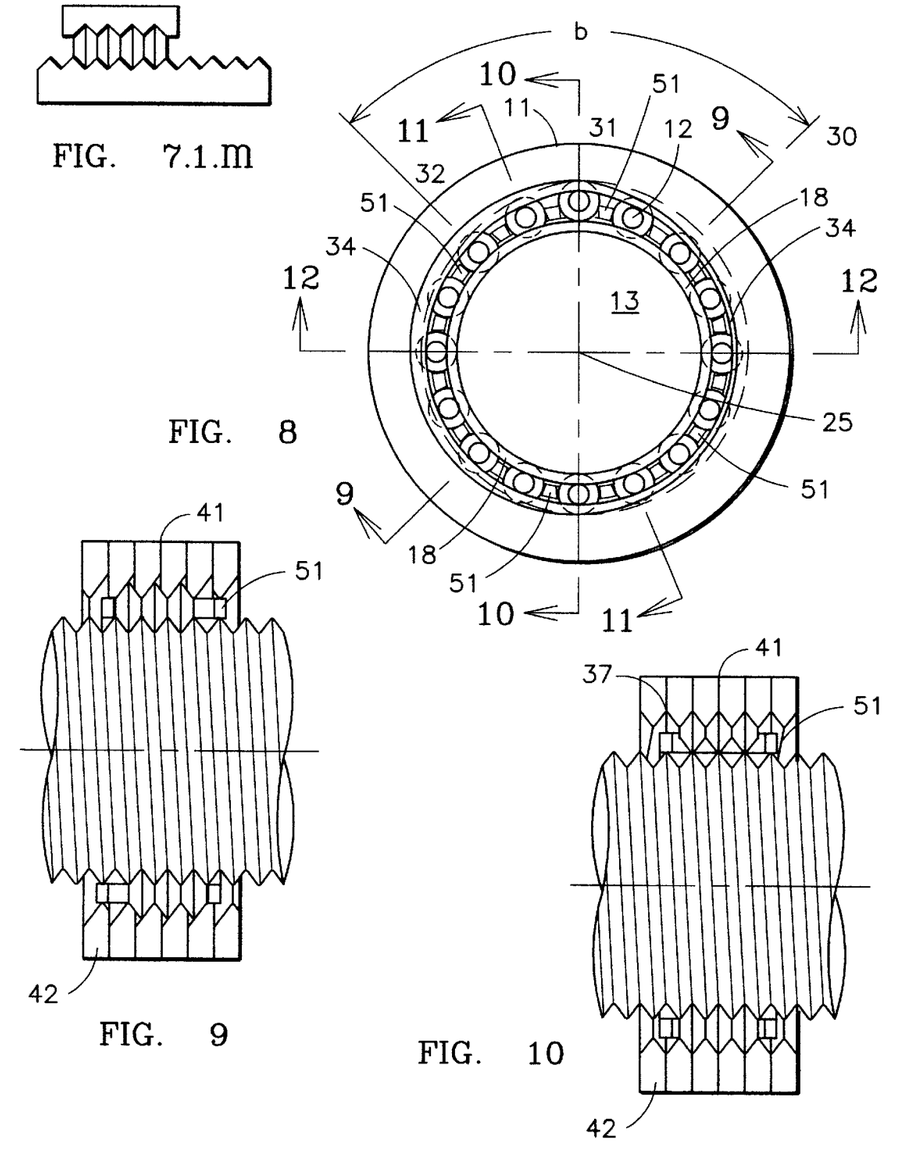
FIG. 8 is an end view of a single lobe system similar to the system of FIG. 5 but with a different thread cut in the nut to improve the engagement between the rollers and nut.
FIGS. 9–12 illustrate progressive movement of the roller elements in the system of FIG. 8 as the rollers translate along the screw rod.
Figure 11:
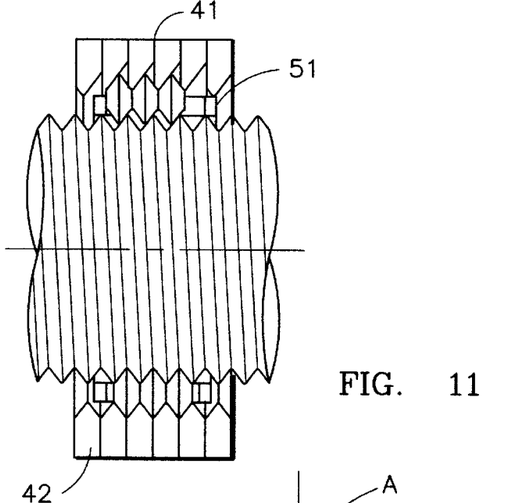
Figure 12:
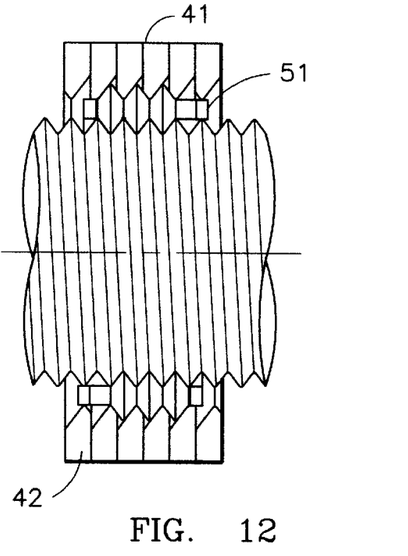

FIG. 8 is a view along the axis 25 of the shaft 13 of a full engagement version. FIGS. 9–12 are cross-sections taken through the assembly at various angular positions to demonstrate radial and axial relationships. Only when a roller 12 begins its climb from full engagement at 30 to crossover at 31 and then again when descending from cross-over to full engagement at 32 as shown in FIGS. 9–11 are the rollers 12 in a diminished (but still contributing) thrust mode.

Figure 18:
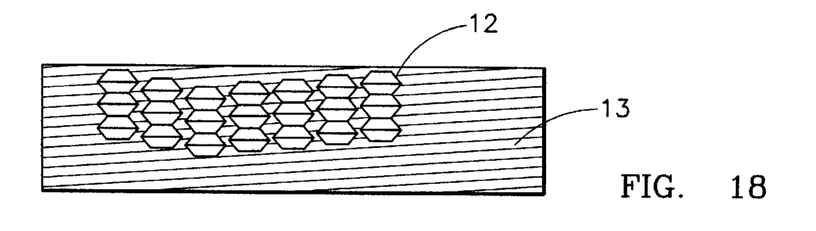
FIG. 18 is a flat development of the embodiment of the invention illustrated in FIG. 8 showing the deployment of the rollers on the screw threads.

The nut grooves 37, while appearing to employ curves when viewed radially (see FIG. 14), may be generated by only two dimensions of operation of cone-shaped cutting device 33. To do so, each groove side 34 requires its own two-dimensional machining pass. To accommodate such a machine operation, the nut 41 may be stratified through use of segments 42, each with succinct opposing groove flanks of identical configuration. FIG. 18 is a flat development of this high-thrust version of the invention to show the axial and radial deployment of the rollers 12 arrayed on the screw threads 18.

Figure 15:
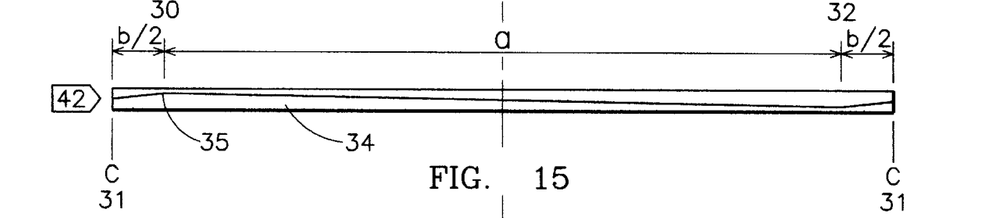
FIGS. 15–17 are flat developments of individual groove segments corresponding to the segment of FIG. 14 as applied to nuts having one, two and three lobes respectively.
Figure 16:
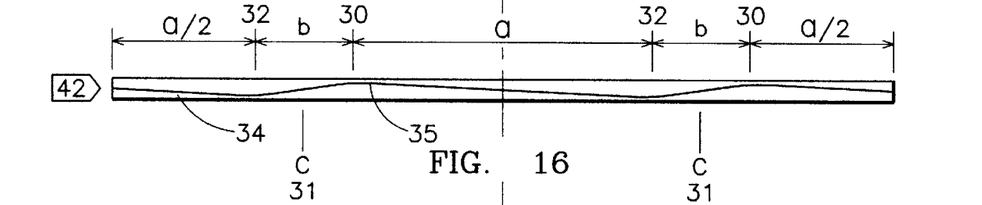
Figure 17:
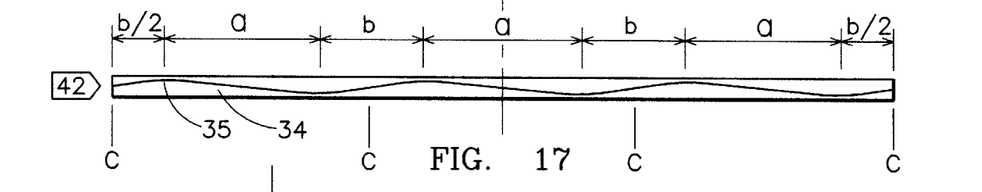

FIGS. 15, 16, 17 are flat or unrolled developments of individual nut segments 42 using the high thrust version of the invention. FIG. 15 involves a one-thread start screw/one-lobe nut in flat presentation. FIG. 16 involves a two-thread start screw/two-lobe nut in flat presentation. FIG. 17 involves a three-thread start screw/three-lobe nut in flat presentation. Note how the groove crest apex line 35 follows the lead angle of the lead screw within dimension "a". While within the "a" dimension, the rollers 12 are fully engaged in the lead screw thread 18. Furthermore, during the "a" dimension period, the rollers 12 simultaneously engage both sides of the nut groove flanks 35.

The dimension "b" demonstrates the region of the nut within which the roller cross-over (of the lead screw major diameter) takes place. Only at "c" are the rollers 12 completely relieved of axial loading. However, during half of dimension "b" travel, the rollers 12 are in a position to be axially loaded but only in one direction. It should be understood that while in the "b" region, the rollers 12 are only partially engaged.

While all versions of the invention may employ a cage or separator 51, the high thrust version, because of axial roller displacement, always requires one. Whenever it is employed in this series, a cage 51 is likely to improve speed capabilities and decrease the potential for rough operation.

Figure 19:
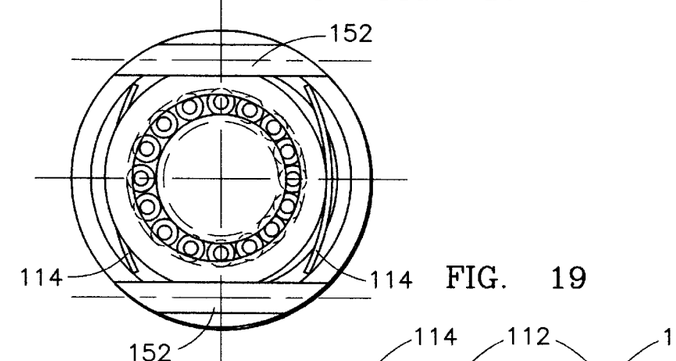
FIGS. 19 and 20 are end and side views respectively of a further embodiment of the present invention incorporating an axial preloading of multiple nuts on a single screw using springs.
Figure 20:
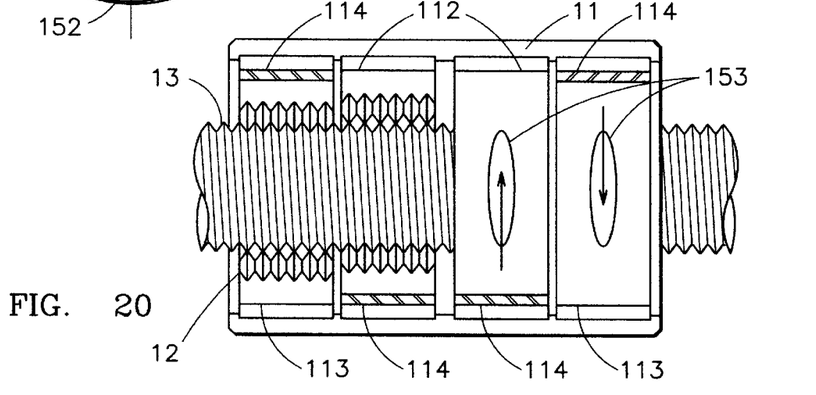
Figure 21:
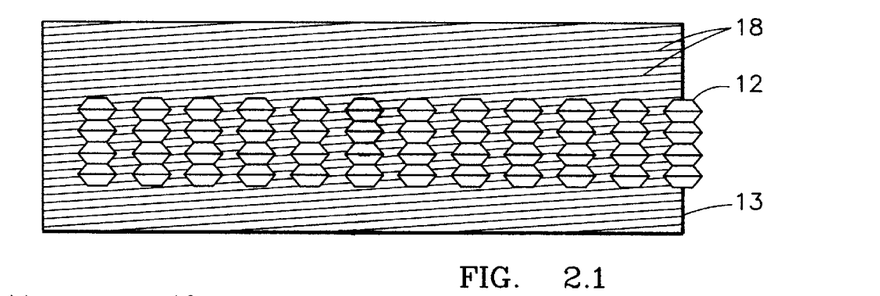
Figure 31:
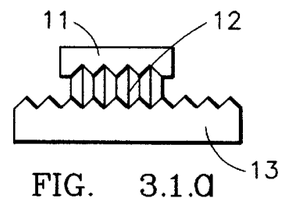
Figure 32:
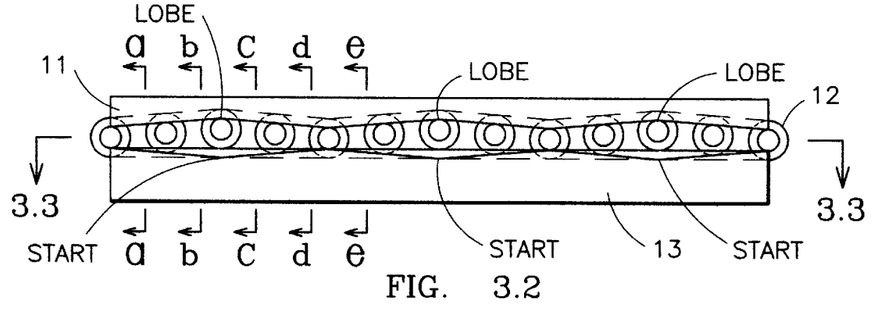
Figure 33:
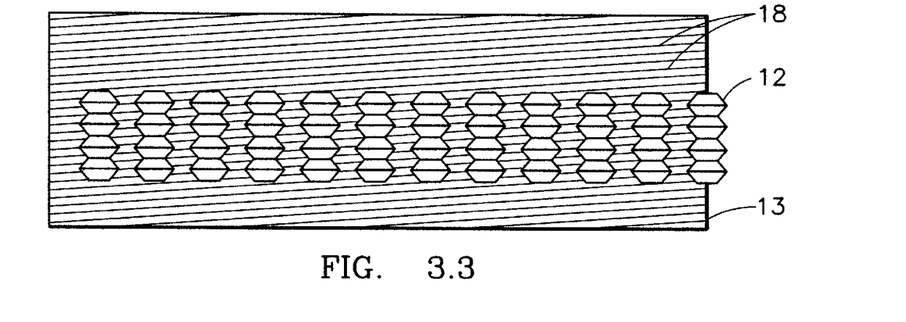
Figure 71:
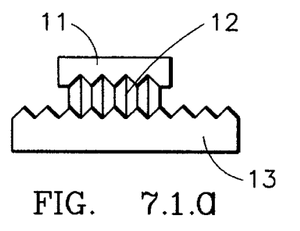

Straight grooved one-lobed nuts 112 and 113 as shown in FIGS. 19 and 20 offer the potential for axial preloading. In this version, a minimum of 3 nuts is employed, although 4 nuts 112, 113 are shown in FIG. 19. Each end nut 113 is caused to shift laterally towards the center of the shaft 13. The center nuts 112 are also caused to shift laterally counter to the two end nuts 113. The nut excursions are produced by springs 114 which constantly apply a radial load on the nut body 112 and 113 which in turn is checked by the shaft 13.

In operation, this spring-load serves to provide a radial pre-load. Furthermore, should an axial overload occur, the shaft 13 may continue to rotate, but the nut assembly will not advance into the overload. In fact, the laterally shifting nuts 112 and 113 will commence reciprocation guided by pins 152 and grooves 153 while allowing normal operation to occur between the nut-roller-shaft train of components. Obviously, the point of overload is determined by sizing or adjusting the springs 114 involved.

One practiced in the art will recognize that the principles of the invention can be applied by reversing the invention's two involved cams, such that lobed non-helical grooves 17 can be installed externally on the shaft and the helical thread 18 can be installed internally in the nut. FIG. 4 depicts an example of the invention applied in this reversed form.

What is claimed is:

1. In a roller screw apparatus for converting rotary motion to linear motion comprising an elongated screw, a nut positioned circumferentially about said screw and separated from said screw by an annular region, and a plurality of elongated roller elements positioned in said annular region in general simultaneous contact with said screw and nut, in axial parallel alignment with said screw, the improvement comprising:

said screw being externally helically threaded including a lead screw portion having a start thread of given pitch, a start thread form and a lead screw axis;

said nut being internally grooved with at least one set of generally annular grooves, each of the grooves lying in a respective one of a plurality of parallel planes thereby forming a set of non-helical grooves having a form matching said start thread form;

said roller elements each being externally grooved with annular non-helical grooves having a form matching said forms of said nut grooves and said start thread; and said nut having at least one radially inner lobed region so as to allow said roller elements to radially and rollingly cycle from regressive lead disengagement through progressive re-engagement without allowing axial displacement with respect to the nut body.

2. The roller screw apparatus of claim 1 wherein said screw includes a preselected number of parallel threads and said nut is formed with a corresponding number of lobed regions circumferentially spaced about said radially inner region.

3. The roller screw of claim 2 wherein said lobed regions are equiangularly spaced about said inner region of said nut.

4. The roller screw of claim 2 and including a plurality of sets of axially spaced roller elements.

5. The roller screw of claim 4 wherein the lobed regions associated with each of the sets of roller elements is circumferentially offset from the lobed regions associated with adjacent sets of roller elements.

6. The roller screw of claim 1 wherein said nut incorporates a single lobed region for axially translating said roller elements with respect to said screw at a single circumferential location within said nut.

7. The roller screw of claim 2 wherein said grooves in said nut have a continually varying contact surface area for engaging mating surfaces on corresponding ones of said rollers.

8. The roller screw of claim 5 and including a plurality of said nuts positioned generally axially adjacent on said screw, each of said nuts being radially loaded for establishing axial preloading of said roller screw.

9. The roller screw of claim 8 and including a housing enclosing each of said nuts and further including springs in said housing for radially loading said nuts.

10. The roller screw of claim 2 wherein said roller elements are restrained within a cage.

11. A roller screw apparatus comprising:

an internally helically threaded nut having a preselected thread pitch and profile;

an elongated rod having a plurality of uniformly spaced, non-helical, circumferential grooves, the spacing between each adjacent pair of grooves corresponding to the pitch of the threads in the nut, each groove further having a profile corresponding to the profile of each thread in the nut, an outer diameter of said rod being less than an inner diameter of said nut for establishing an annular region therebetween;

a plurality of elongated roller elements positioned in and substantially filling said annular region, each of said roller elements being formed with outer circumferential grooves having a profile corresponding to the profile of the threads in said nut and having a spacing corresponding to the pitch of the threads in said nut; and said nut having at least one axially extending, radially inner lobed region of sufficient radial extent to allow said roller elements to move radially and shift position axially with respect to the grooves in said rod for advancing said nut with respect to said rod.

* * * * *